US010879778B2

(12) United States Patent
Gangi et al.

(10) Patent No.: US 10,879,778 B2
(45) Date of Patent: Dec. 29, 2020

(54) ROTOR OF ROTATING ELECTRIC MACHINE AND MANUFACTURING METHOD OF THE SAME

(71) Applicant: TOYOTA JIDOSHA KABUSHIKI KAISHA, Toyota (JP)

(72) Inventors: Suguru Gangi, Toyota (JP); Hiroyuki Hattori, Okazaki (JP); Shinya Sano, Toyota (JP); Ken Noda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 16/059,820

(22) Filed: Aug. 9, 2018

(65) Prior Publication Data

US 2019/0109525 A1     Apr. 11, 2019

(30) Foreign Application Priority Data

Oct. 5, 2017     (JP) .................. 2017-195270

(51) Int. Cl.
| | |
|---|---|
| *H02K 1/27* | (2006.01) |
| *H02K 1/28* | (2006.01) |
| *H02K 15/12* | (2006.01) |
| *H02K 15/10* | (2006.01) |
| *H02K 15/03* | (2006.01) |
| *H02K 11/01* | (2016.01) |

(52) U.S. Cl.
CPC ............. *H02K 15/12* (2013.01); *H02K 1/276* (2013.01); *H02K 15/03* (2013.01); *H02K 15/10* (2013.01); *H02K 1/28* (2013.01); *H02K 11/01* (2016.01)

(58) Field of Classification Search
CPC .......... H02K 1/27–1/278; H02K 15/03; H02K 15/10; H02K 11/01

USPC ................. 310/43, 156.53, 156.56
See application file for complete search history.

(56) References Cited

U.S. PATENT DOCUMENTS

| | | | |
|---|---|---|---|
| 2016/0254711 | A1 | 9/2016 | Kawamoto et al. |
| 2018/0226851 | A1* | 8/2018 | Kawamoto .......... H02K 1/2773 |

FOREIGN PATENT DOCUMENTS

| | | |
|---|---|---|
| CN | 205081592 U | 3/2016 |
| DE | 102012202529 A1 | 8/2013 |
| JP | H08-322173 A | 12/1996 |
| JP | 2012-244838 A | 12/2012 |
| JP | 2012244838 A * | 12/2012 |
| JP | 2015-023620 A | 2/2015 |

(Continued)

OTHER PUBLICATIONS

Machine Translation, Yanagida, JP-2012244838-A, Dec. 2012. (Year: 2012).*

*Primary Examiner* — Thomas Truong
(74) *Attorney, Agent, or Firm* — Oliff PLC (57) ABSTRACT

A rotor for a rotating electric machine includes: a rotor core having magnet holes; magnets inserted in the magnet holes of the rotor core. Each of the magnets includes two first surfaces respectively facing outward and inward of the rotor radial direction, and two second surfaces respectively facing one side and the other side of the rotor circumferential direction. Both ends in the rotor axial direction of at least one first surface of the two first surfaces are covered with electric insulating films, and a lateral surface region between both ends of the one first surface that are covered with the electric insulating films, and the two second surfaces are covered with no electric insulating films.

4 Claims, 6 Drawing Sheets

(56) References Cited

FOREIGN PATENT DOCUMENTS

| | | |
|---|---|---|
| JP | 2016-005419 A | 1/2016 |
| JP | 2017-093038 A | 5/2017 |

* cited by examiner

ROTOR OF ROTATING ELECTRIC MACHINE AND MANUFACTURING METHOD OF THE SAME

INCORPORATION BY REFERENCE

The disclosure of Japanese Patent Application No. 2017-195270 filed on Oct. 5, 2017 including the specification, drawings and abstract is incorporated herein by reference in its entirety.

BACKGROUND

1. Technical Field

The present disclosure relates to a rotor of a rotating electric machine, having magnets inserted in magnet holes that are formed in a rotor core, and to a manufacturing method of the same.

2. Description of Related Art

In a rotor of a rotating electric machine included in the rotating electric machine, there is known a configuration in which magnets are inserted into magnet holes formed in a rotor core so as to be fixed to the rotor core.

Japanese Patent Application Publication No. 2015-23620 (JP 2015-23620 A) describes a configuration in which each magnet is inserted into each magnet hole formed in a rotor core, and entire surfaces parallel to the rotor axial direction at both ends in the rotor axial direction of each magnet are covered with electric insulating films. In this configuration, in each magnet, parts located between both ends in the rotor axial direction that are covered with the electric insulating films are not covered with the electric insulating films. Accordingly, it is described that increase in loss of the rotating electric machine can be reduced even when the eddy current occurs in the magnets, and the electric insulating films can be reduced.

SUMMARY

In the configuration described in JP 2015-23620 A, parts where the magnets and the rotor core are in contact with each other with no electric insulating films interposed therebetween can be reduced or eliminated; therefore, it is possible to reduce the eddy current loss due to reduction of circulation current via the magnets and the rotor core. Unfortunately, in the configuration described in JP 2015-23620 A, in each magnet, the entire surfaces parallel to the rotor axial direction at both ends in the rotor axial direction of the magnet are covered with the electric insulating films; therefore, there is still room for further improvement in reduction of the electric insulating films as well as further cost reduction. In the meantime, if the electric insulating films are omitted from the entire surfaces of each magnet, it is difficult to stably restrict the position of each magnet in each magnet hole.

In a rotor of a rotating electric machine and a manufacturing method of this rotor, the present disclosure reduces the eddy current loss, reduce the cost, and also restricts the position of each magnet in each magnet hole in a stable manner.

A first aspect of the present disclosure is a rotor for a rotating electric machine. The rotor includes: a rotor core having magnet holes; and magnets inserted in the magnet holes of the rotor core. Each of the magnets includes two first surfaces respectively facing outward and inward of the rotor radial direction, and two second surfaces respectively facing one side and the other side of the rotor circumferential direction. Both ends in a rotor axial direction of at least one first surface of the two first surfaces are covered with electric insulating films, and a lateral surface region between both ends of the one first surface that are covered with the electric insulating films, and the two second surfaces are not covered with the electric insulating films.

With the above configuration, it is possible to reduce or eliminate contact parts between the magnets and the rotor core with no electric insulating films interposed therebetween; thus, it is possible to reduce the eddy current loss due to reduction of circulation current via the magnets and the rotor core. In addition, both ends in the rotor axial direction of at least one first surface of the two first surfaces parallel to the rotor axial direction are covered with the electric insulating films, but the two second surfaces are not covered with the electric insulating films; therefore, the surfaces where the electric insulating films are formed in each magnet are reduced, to thus reduce the cost. Unlike the configuration in which the entire surfaces of each magnet are not formed with the electric insulating film, it is possible to bring the one first surface of each magnet to come in contact with the inner surface of the magnet hole via the electric insulating film, and stably restrict the position of the magnet in the magnet hole in the direction orthogonal to the first surface of the magnet.

In the rotor for the rotating electric machine, the rotor may further include positioning members configured to prevent movement of each magnet in the direction orthogonal to the second surfaces of the magnet. The positioning members may be disposed on both ends in the rotor axial direction.

With the above configuration, the second surfaces of each magnet formed with no electric insulating films can be prevented from coming in direct contact with the rotor core, to thus suppress loss worsening due to the eddy current loss.

In the rotor for the rotating electric machine, both ends in the rotor axial direction of only the one first surface may be covered with the electric insulating films. The other first surface of the two first surfaces may be out of direct contact with the rotor core.

With the above configuration, the surfaces where the electric insulating films are formed are further reduced in each magnet; therefore, the cost can further be reduced.

In the rotor of the rotating electric machine, the rotor may further include positioning members configured to prevent movement of each magnet in the direction orthogonal to the second surfaces. Both ends in the rotor axial direction of only the one first surface may be covered with the electric insulating films. The other first surface of the two first surfaces may be out of direct contact with the rotor core. The positioning members may be disposed such that a gap is formed between the other first surface and the rotor core.

With the above configuration, using no resin for fixing the magnets, it is possible to suppress loss worsening caused by a contact between the other first surface of each magnet and the rotor.

In manufacturing method of the rotor for the rotating electric machine, the manufacturing method may include: a jig fixing step of fixing positioning jigs respectively to both ends in the rotor axial direction of the rotor core so as to cover end openings of each magnet hole, in a state in which each magnet is disposed in each magnet hole; and a resin pouring step of pouring and hardening resin between each magnet hole and each magnet via a hole formed in at least one of the positioning jigs, in a state in which both ends of the magnet are held by two pin projections of each positioning jig, the two pin projections being inserted in each magnet hole so as to prevent movement of the magnet in a direction orthogonal to the second surfaces of the magnet.

With the above manufacturing method of the rotor of the rotating electric machine, it is possible to prevent each magnet from being fixed to each magnet hole when the second surfaces of the magnet comes in direct contact with the rotor core, to thus suppress loss worsening due to the eddy current loss.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings. In the following description, shapes, materials, and the numbers of components are merely exemplified for explanation, and may be appropriately changed in accordance with the specifications of a rotor of a rotating electric machine. Hereinafter, equivalent components will be denoted by the same reference numerals in all the following drawings. In explanation of the present description, previously-mentioned reference numerals will be used if necessary.

Figure 1:
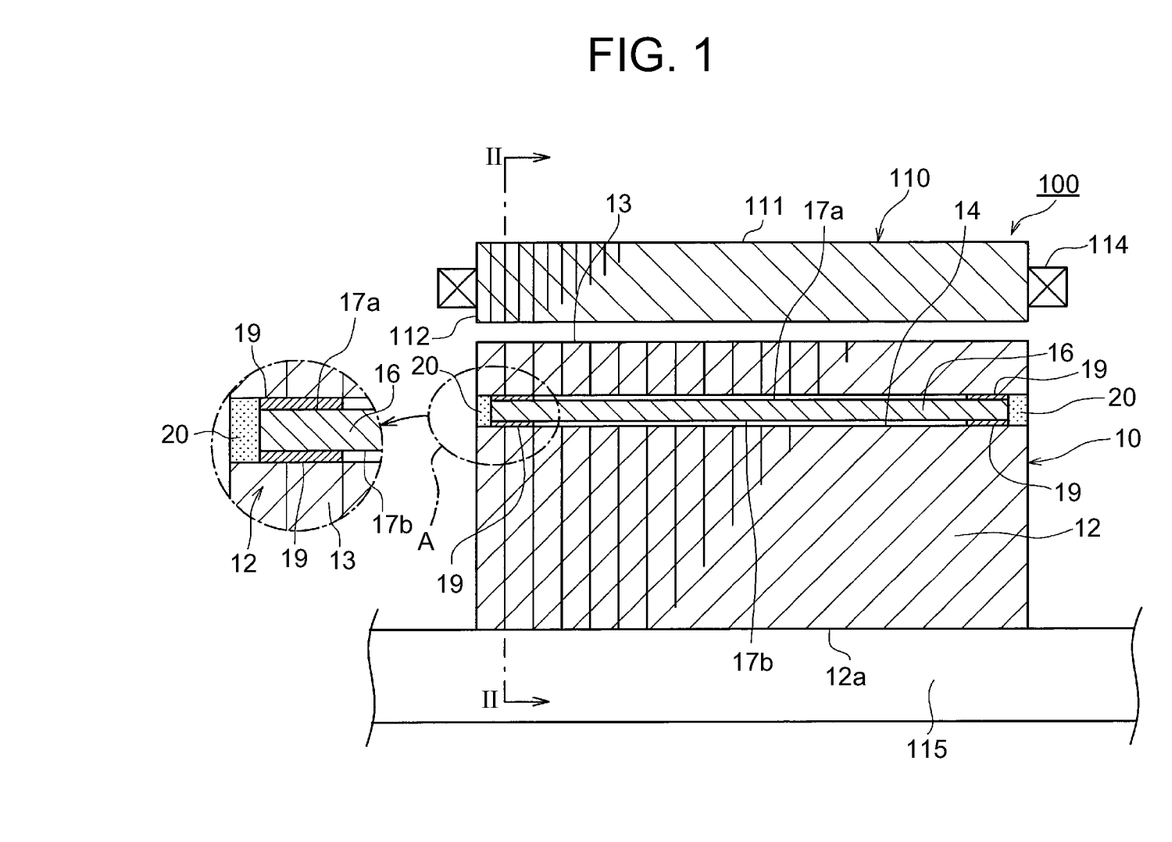
FIG. 1 shows a half sectional view of a rotating electric machine including a rotor of the rotating electric machine of an embodiment according to the present disclosure, and an enlarged view of a part A thereof.
Figure 2:
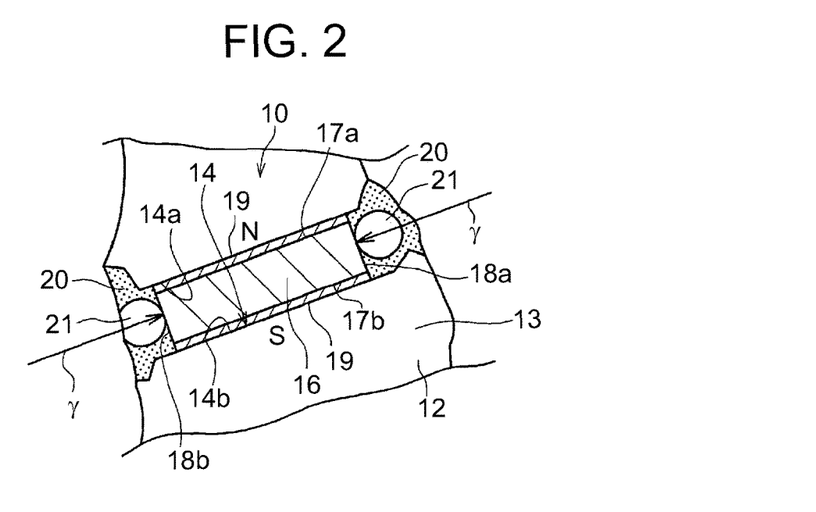
FIG. 2 is a sectional view taken along line II-II in FIG. 1 in a part in the circumferential direction of the rotor of the rotating electric machine.

FIG. 1 shows a half sectional view of a rotating electric machine 100 including a rotor of a rotating electric machine 10 of the embodiment, and also shows an enlarged view of a part A thereof. FIG. 2 is a sectional view taken along line II-II in FIG. 1 in a part in the circumferential direction of the rotor of the rotating electric machine 10. Hereinafter, the rotor of the rotating electric machine 10 might also be referred to as a rotor 10.

The rotor 10 is used for forming the rotating electric machine 100. The rotating electric machine 100 will be described with reference to FIG. 1. The rotating electric machine 100 is a permanent magnet type synchronous motor that drives with three-phase AC current. For example, the rotating electric machine 100 is used as a motor driving a hybrid vehicle or as an electric power generator, or as a motor generator having both the functions.

The rotating electric machine 100 includes a stator 110, the rotor 10 disposed radially inward of the stator 110, and a rotary shaft 115. The stator 110 is configured to include a generally cylindrical stator core 111, a stator coil 114 wound around multiple teeth 112 projecting from the inner circumferential surface of the stator core 111. The stator 110 is fixed to the inner side of a case (not illustrated).

The rotor 10 is a cylindrical member configured such that the rotary shaft 115 is inserted in the rotor 10 in use. The rotor 10 is disposed inside the case in use. Inside the case, the rotor 10 is disposed radially inward of the stator 110 so as to face the stator 110. In this state, both ends of the rotary shaft 115 are rotatably supported by bearings (not-illustrated) relative to the case. A clearance in the radial direction is formed between an outer circumferential surface of the rotor 10 and an inner circumferential surface of the stator 110. Magnets 16 are disposed at multiple positions in the circumferential direction of the rotor 10, as described later. In this manner, the rotating electric machine 100 is formed. In the following description, a "rotor radial direction" denotes a direction of radiation from rotor 10, that is, a radial direction of the rotor 10, and a "rotor circumferential direction" denotes a direction along in a circular shape around the central axis of the rotor 10. A "rotor axial direction" denotes a direction along the central axis of the rotor 10.

The rotor 10 includes a rotor core 12, and the magnets 16 that are permanent magnets embedded in the rotor core 12 at multiple positions in the circumferential direction of the rotor core 12. Specifically, the rotor core 12 is formed by stacking, in the axial direction, multiple disk-shaped steel plates 13 made of a magnetic material. A shaft hole 12a is formed in the center part of the rotor core 12, and multiple magnet holes 14 are formed around the shaft hole 12a. The rotary shaft 115 is fixed into the shaft hole 12a. The multiple magnet holes 14 are so formed as to extend in the rotor axial direction at the multiple positions in the circumferential direction of the rotor core 12. The magnets 16 are inserted into the magnet holes 14, and are fixed thereto by resin portions 20 described later.

Each of the multiple magnets 16 is formed in a rectangular parallelopiped shape as a whole, and long in the rotor axial direction. Each magnet 16 includes two first surfaces 17a, 17b that are parallel to the rotor axial direction and face the rotor radial direction, and two second surfaces 18a, 18b that are parallel to the rotor axial direction and face the rotor circumferential direction. The two first surfaces 17a, 17b respectively face the outward and inward generally in the rotor radial direction. The two second surfaces 18a, 18b respectively face one side and the other side generally in the rotor circumferential direction. Specifically, the multiple magnet holes 14 are arranged in such a manner that two magnet holes are defined as one set, and multiple sets of magnet holes 14 are disposed at multiple positions in the circumferential direction of the rotor core 12. The two magnet holes 14 in each set are arranged in a V-shape opening outward in the rotor radial direction (upward direction in FIG. 2). FIG. 2 shows a single magnet hole 14 of each set of the magnet holes 14. The magnet hole 14 includes two flat surface portions 14a, 14b, at an intermediate part of the rotor circumferential direction, that are inclined relative to the rotor circumferential direction and parallel to each other. A space defined between the two flat surface portions 14a, 14b is a magnet-insertion portion in a rectangular parallelepiped shape long in the rotor axial direction.

The multiple magnets 16 are inserted into the respective magnet insertion portions of the multiple magnet holes 14 one by one. At this time, gaps are formed at both ends in the rotor circumferential direction of each magnet hole 14. Resin as a magnet fixing material in a molten state is poured into these gaps, and is hardened therein, to thereby form resin portions 20 basically extending in the axial direction. These resin portions 20 fix the magnets 16 relative to the rotor core 12. In FIG. 2, the resin portions 20 are indicated by half-tone dot meshing. The resin portions 20 are formed by pouring the molten resin from one end of each magnet hole 14 with the magnets 16 inserted in the respective magnet holes 14, hardening the resin by heat, and cooling the resin to a normal temperature.

Figure 3:
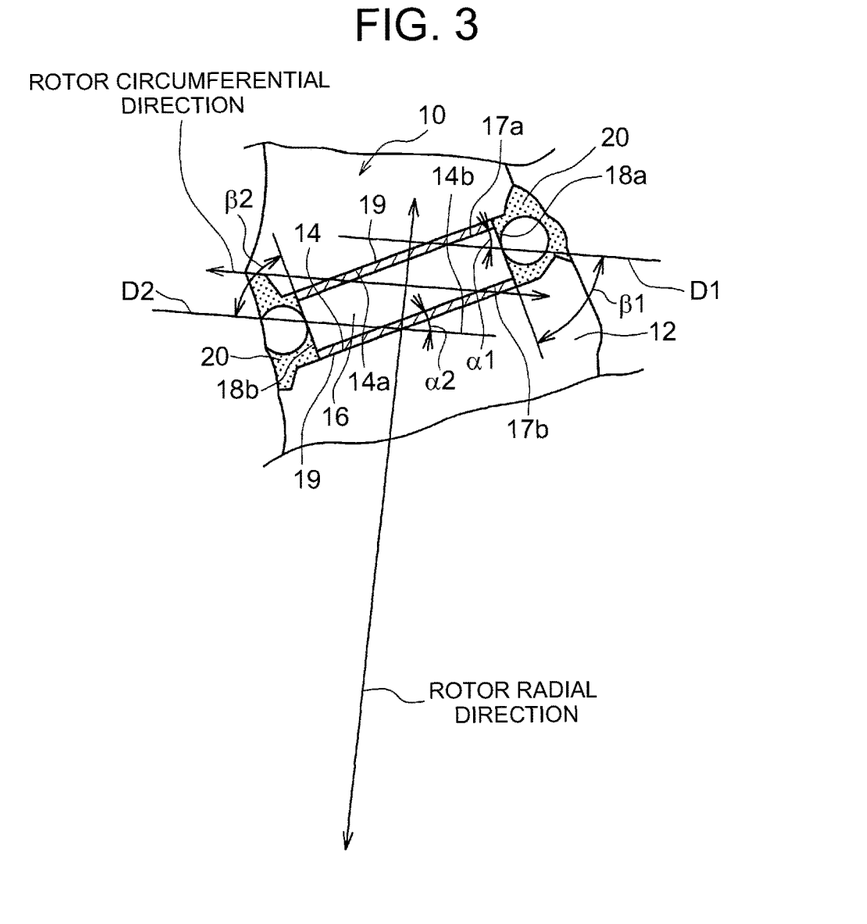
FIG. 3 is a view corresponding to FIG. 2, explaining definitions of first surfaces and second surfaces of each magnet.

FIG. 3 is a view corresponding to FIG. 2 for explaining the definitions of the first surfaces 17a, 17b and the second surfaces 18a, 18b of each magnet 16. In each magnet 16, the two first surfaces 17a, 17b are surfaces facing the flat surface portions 14a, 14b of each magnet hole 14, and these surfaces have angles $\alpha 1$, $\alpha 2$ of less than 45°, which are respectively defined by a plane D1 and a plane D2 orthogonal to the rotor radial direction. The first surface 17a that is one first surface of the two first surfaces 17a, 17b is a surface facing radially outward generally in the rotor radial direction, and the other first surface 17b of the first surfaces 17a, 17b is a surface facing radially inward generally in the rotor radial direction. In addition, in each magnet 16, the two second surfaces 18a, 18b are surfaces facing the resin portions 20 located at both sides in the rotor circumferential direction. The two second surfaces 18a, 18b are surfaces having angles $\beta 1$, $\beta 2$ of more than 45°, which are respectively defined by the plane D1 and the plane D2 orthogonal to the rotor radial direction. The second surface 18a that is one second surface of the two second surfaces 18a, 18b is a surface facing one side generally in the rotor circumferential direction, and the other second surface 18b of the second surfaces 18a, 18b is a surface facing the other side generally in the rotor circumferential direction. In FIG. 3, the "rotor circumferential direction" indicates a direction of a tangential line of a circle that coincides with the rotor circumferential direction. The plane D1 and the plane D2 are parallel to this tangential line.

The magnetizing direction of each magnet 16 is a direction orthogonal to the respective first surfaces 17a, 17b. In a part of the rotor 10 shown in FIG. 2, the magnet 16 is magnetized such that the first surface 17a located outward in the rotor radial direction of the magnet 16 becomes an N-pole, and the first surface 17b located inward in the rotor radial direction of the magnet 16 becomes an S-pole.

The multiple magnets 16 are configured such that every two adjacent magnets 16 that form a V-shape are defined to be a single set, and each set of the magnets 16 forms a single magnetic pole.

Furthermore, as shown in FIG. 1 and FIG. 2, in each magnet 16, both ends in the rotor axial direction of each of the two first surfaces 17a, 17b are covered with electric insulating films 19. The electric insulating films 19 are formed by an electric insulating material such as resin, and are provided to film-forming-target portions of each magnet 16 in a film forming step. Along with this, in each of the two first surfaces 17a, 17b, a lateral surface region between both ends of the first surface that are covered with the electric insulating films 19 is not covered with the electric insulating film. Addition to this, in each magnet 16, the two second surfaces 18a, 18b (FIG. 2, FIG. 3) are not covered with the electric insulating films.

In a state in which each magnet 16 is inserted in each magnet hole 14, the respective both ends in the rotor axial direction of the first surfaces 17a, 17b of the magnet 16 are in contact with the respective flat surface portions 14a, 14b of the magnet hole 14 via the electric insulating films 19. The lateral surface regions between the respective both ends of the first surfaces 17a, 17b of the magnet 16 are out of contact with the respective flat surface portions 14a, 14b of the magnet hole 14.

Next, in the manufacturing method of the rotor 10, the method of fixing each magnet 16 into each magnet hole 14 with the resin will be described. The manufacturing method of the rotor 10 includes a jig fixing step and a resin pouring step.

Figure 4:
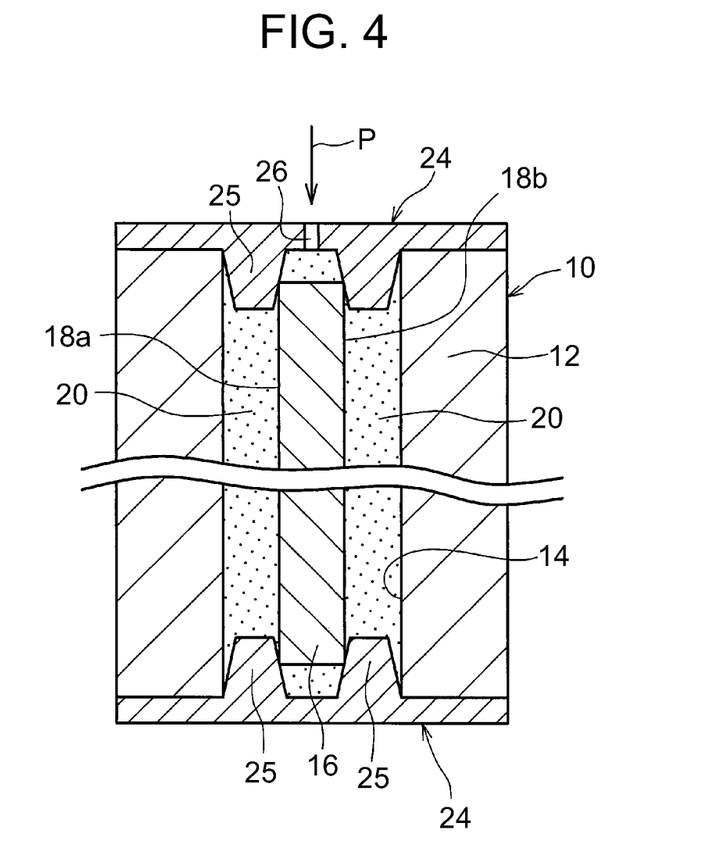
FIG. 4 is a view showing a resin pouring step of pouring resin into each magnet hole in a manufacturing method of the rotor of the rotating electric machine of the embodiment according to the present disclosure, and is a sectional view corresponding to a part in the circumferential direction of the rotor of the rotating electric machine.

FIG. 4 is a view showing the resin pouring step of pouring the resin into each magnet hole 14 in the manufacturing method of the rotor 10, and is a sectional view corresponding to a part in the circumferential direction of the rotor 10. In the "jig fixing step", as shown in FIG. 4, in a state in which each magnet 16 is disposed in each magnet hole 14, positioning jigs 24 are respectively fixed to both ends in the rotor axial direction of the rotor core 12 so as to cover openings at both ends of each magnet hole 14. Each positioning jig 24 is a die in a disk shape, having a lateral surface on the rotor core 12 side from which two pin projections 25 project, and the pin projections 25 are inserted in the magnet holes 14 such that two pin projections 25 project from each position of multiple positions facing the multiple magnet holes 14. Each pin projection 25 is formed in a truncated cone shape having a diameter gradually smaller toward its front end. The outer circumferential surfaces of the two pin projections 25 are pushed against each end in the rotor axial direction of the magnet 16, from each side in the rotor circumferential direction of the magnet 16. With this configuration, a compressing force is applied to the magnet 16 from each side by the two pin projections 25 in a direction orthogonal to the two second surfaces 18a, 18b (direction indicated by an arrow γ in FIG. 2).

In the "resin pouring step", in a state in which each end of each magnet 16 is held by the two pin projections 25 of each positioning jig 24 so as to prevent movement of the magnet 16 in the direction orthogonal to the second surfaces 18a, 18b of the magnet 16, the resin is poured and hardened into the each magnet hole 14. At this time, the molten resin is poured through a resin pouring hole 26 formed in one (the upper one in FIG. 4) of the two positioning jigs 24 in the direction indicated by an arrow P in FIG. 4 so as to be hardened between the magnet hole 14 and the magnet 16. For example, in one of the positioning jigs 24, the resin pouring hole 26 is formed at a position facing the end surface in the rotor axial direction of the magnet 16. In the state in which the resin is poured and hardened in each magnet hole 14, when each positioning jig 24 is removed from the rotor 10, circular-shaped recesses 21 (FIG. 2) that are insertion marks of the pin projections 25 of each positioning jig 24 are formed in each end in the rotor circumferential direction of the magnet hole 14.

The resin pouring hole may be formed in each of the two positioning jigs 24. In this case, the molten resin is poured into each magnet hole 14 through the resin pouring holes from both ends in the rotor axial direction of the magnet hole 14. In addition, the length in the rotor axial direction of the magnet 16 is shorter than the length in the rotor axial direction of the magnet hole 14, and respective spaces formed between both opening ends of each magnet hole 14 and both end surfaces in the rotor axial direction of each magnet hole 14 are also charged with the resin. FIG. 1 illustrates that gaps are formed between the respective lateral surface regions between the respective both ends of the first surfaces 17a, 17b of each magnet 16 that are covered with the electric insulating films 19, and the magnet hole 14, but parts corresponding to these gaps are actually charged with the resin as well. The multiple magnets 16 are fixed to the rotor core 12 in the above manner, to thereby form the rotor 10.

According to the above-configured rotor 10, the respective both ends in the rotor axial direction of the two first surfaces 17a, 17b parallel to the rotor axial direction are covered with the electric insulating films. With this configuration, it is possible to reduce or eliminate contact parts between the magnets 16 and the rotor core 12 with no the electric insulating films 19 interposed therebetween. Accordingly, it is possible to suppress occurrence of a large circulating current via the magnets 16 and the rotor core 12, to thereby reduce the eddy current loss. Furthermore, in each magnet 16, although the respective both ends in the rotor axial direction of the two first surfaces 17a, 17b are covered with the electric insulating films 19, in each of the first surfaces 17a, 17b, the lateral surface region between both ends covered with the electric insulating film 19 is not covered with the electric insulating film, either. The entire surfaces of the two second surfaces 18a, 18b are not covered with the electric insulating films. Accordingly, the surfaces where the electric insulating films are formed in each magnet 16 are reduced, to thereby reduce the cost for the rotor 10.

In each magnet 16, the respective both ends in the rotor axial direction of the two first surfaces 17a, 17b are covered with the electric insulating films 19. Accordingly, unlike the configuration in which the entire surfaces of each magnet 16 are not covered with electric insulating films, the two first surfaces 17a, 17b of each magnet 16 can be in contact with the inner surface of each magnet hole 14 via the electric insulating films 19, and thus it is possible to stably restrict the position in the direction orthogonal to the first surfaces of the magnet 16, inside the magnet hole 14.

In addition, according to the above manufacturing method of the aforementioned rotor, in the jig fixing step and in the resin pouring step, the resin is poured into each magnet hole 14 in the state in which the movement of the magnet 16 in the direction orthogonal to the second surfaces 18a, 18b of the magnet 16 is prevented by the pin projections 25 of the positioning jigs 24 (FIG. 4). Accordingly, it is possible to prevent each magnet 16 from being fixed to the rotor core 12 when the second surfaces 18a, 18b of the magnet 16 comes in direct contact with the rotor core 12, thus suppressing loss worsening due to the eddy current loss.

Figure 5:
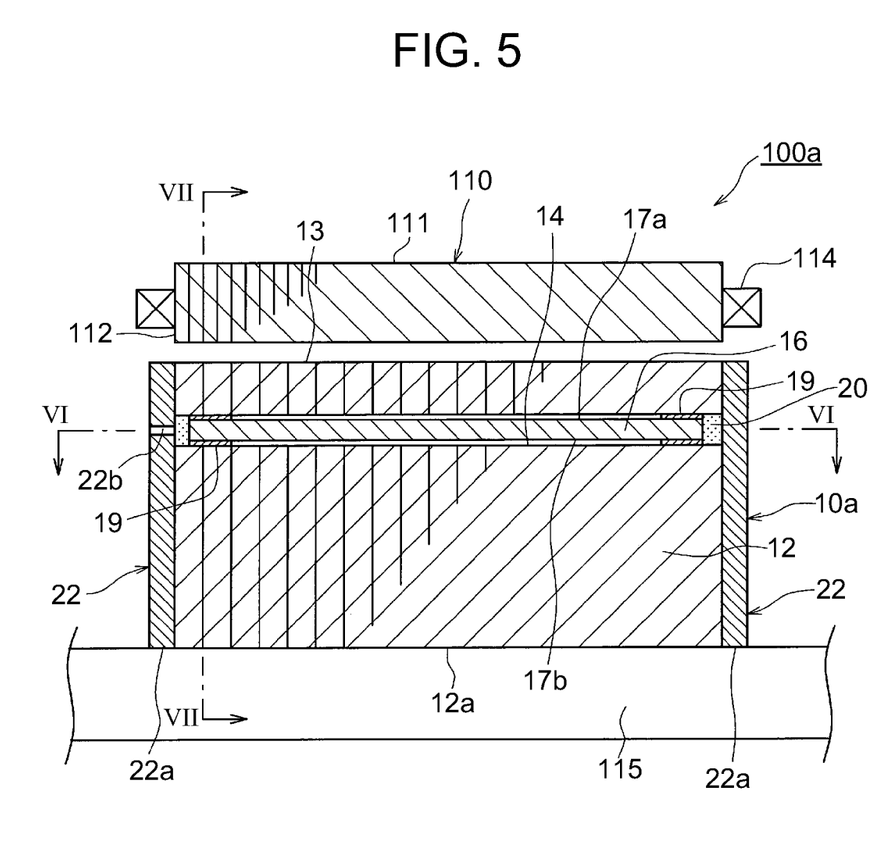
FIG. 5 is a half sectional view of the rotating electric machine including a rotor of the rotating electric machine of another example of the embodiment according to the present disclosure.
Figure 6:
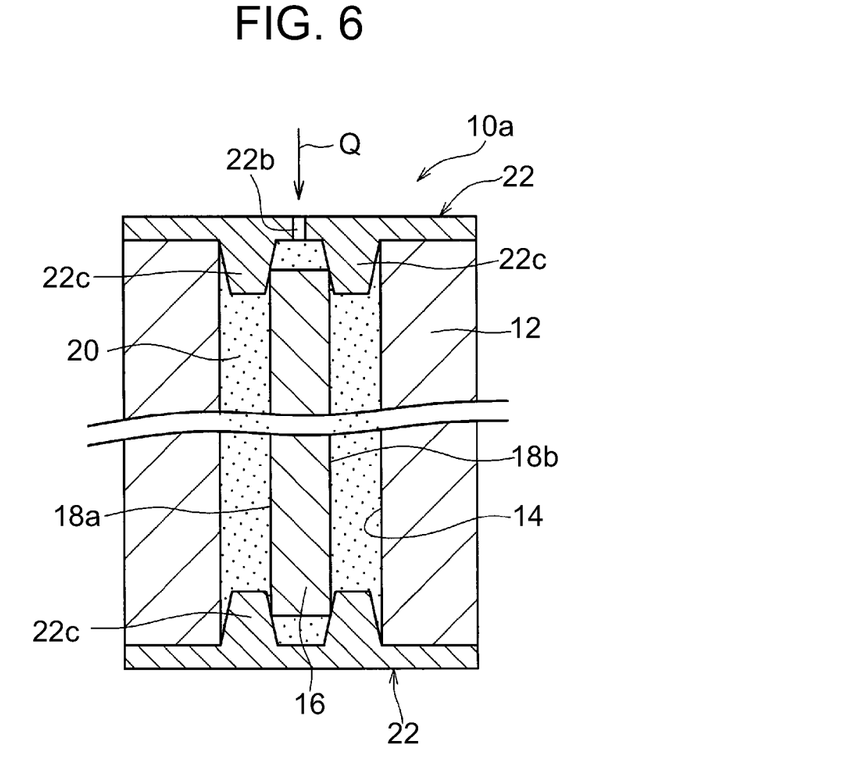
FIG. 6 is a sectional view taken along line VI-VI of FIG. 5 in a part in the circumferential direction of the rotor of the rotating electric machine.
Figure 7:
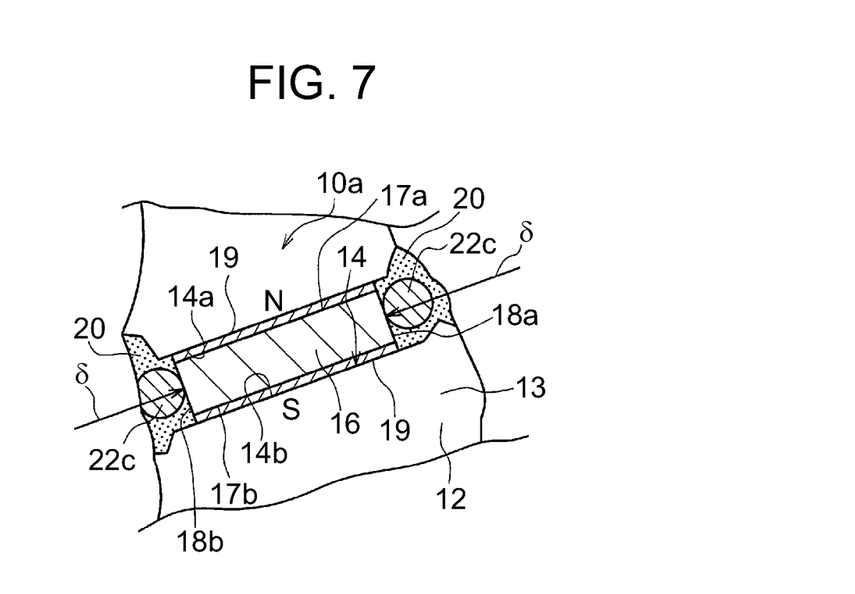
FIG. 7 is a sectional view taken along line VII-VII of FIG. 5 in the part in the circumferential direction of the rotor of the rotating electric machine.

FIG. 5 is a half sectional view of a rotating electric machine 100a including a rotor 10a of another example of the embodiment. FIG. 6 is a sectional view taken along line VI-VI of FIG. 5 in a part in the circumferential direction of the rotor 10a. FIG. 7 is a sectional view taken along line VII-VII of FIG. 5 in the part in the circumferential direction of the rotor 10a.

In the configuration of the present example, different from the configurations in FIG. 1 to FIG. 4, the rotor 10a includes end plates 22 disposed on both ends in the rotor axial direction of the rotor 10a. Each end plate 22 is formed by a non-magnetic material in a disk shape in such a manner that the rotary shaft 115 is inserted and fixed into a center hole 22a formed in the center of the end plate 22. For example, the end plate 22 is formed by aluminum, an aluminum alloy, or a non-magnetic metal such as non-magnetic stainless steel. The rotor core 12 is held by the two end plates 22 from both sides in the rotor axial direction of the rotor core 12. Each end plate 22 corresponds to a positioning member to prevent movement of the magnet 16 in the predetermined direction, as described later.

In the end plate 22 that is one (left one in FIG. 5 and upper one in FIG. 6) of the two end plates 22, at multiple positions in the rotor circumferential direction that face respective one ends of the multiple magnet holes 14, resin pouring holes 22b extending through the end plate in the rotor axial direction are formed.

Furthermore, as shown in FIG. 6, each end plate 22 having a lateral surface on the rotor core 12 side from which two pin projections 22c project, and the pin projections 22c are inserted in the magnet holes 14 arranged such that two pin projections 22c project from each position of multiple positions facing the multiple magnet holes 14. Each pin projection 22c is formed in a truncated cone shape having a diameter gradually smaller toward its front end. The outer circumferential surfaces of the two pin projections 22c are pushed against each end in the rotor axial direction of the magnet 16, from each side in the rotor circumferential direction of the magnet 16. With this configuration, a compressing force is applied to the magnet 16 from each side by the two pin projections 25 in a direction orthogonal to the two second surfaces 18a, 18b (direction indicated by an arrow δ in FIG. 7). Accordingly, each end plate 22 prevents movement of each magnet 16 in the direction orthogonal to the second surfaces 18a, 18b that is a predetermined direction of the magnet 16.

When the resin is poured into each magnet hole 14, molten resin is poured into the magnet hole 14 through a resin pouring hole 22b in a state in which the end plates 22 are placed on both ends in the rotor axial direction of the rotor core 12, as indicated by an arrow Q in FIG. 6. After being heated and hardened, the resin is cooled to the normal temperature so as to be formed into each resin portion 20.

According to the above configuration, the pin projections 22c can prevent the second surfaces 18a, 18b of each magnet 16 that are formed with no electric insulating films from coming in direct contact with the rotor core 12, to thus suppress loss worsening due to the eddy current loss. In addition, unlike the configurations of FIG. 1 to FIG. 4, it becomes unnecessary to form special shapes for the pin projections in a die for the resin pouring. In the present example, the other configurations and operation are the same as the configurations in FIG. 1 to FIG. 4. Both of the two end plates 22 may be formed with holes for the resin pouring.

Figure 8:
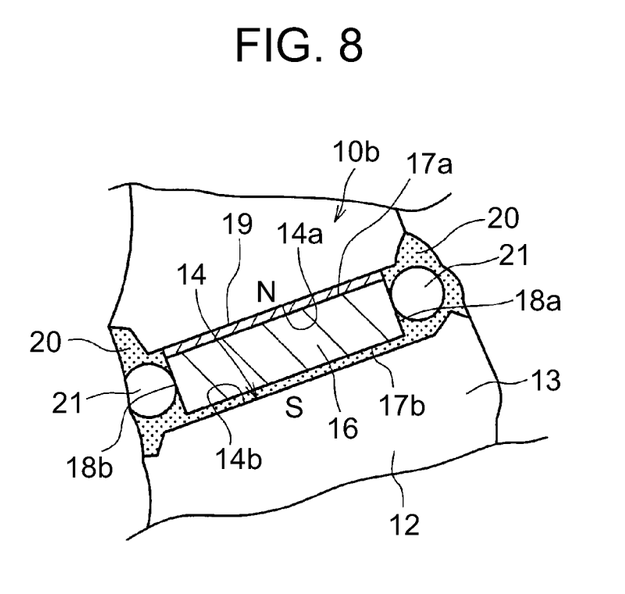
FIG. 8 is a view corresponding to FIG. 2 showing a rotor of the rotating electric machine of another example of the embodiment according to the present disclosure.

FIG. 8 is a view corresponding to FIG. 2, and showing a rotor 10b of another example of the embodiment. In the configuration of the present example, different from the configurations of FIG. 1 to FIG. 4, in each magnet 16, both ends in the rotor axial direction of only the one first surface 17a (upper one in FIG. 8) of the first surfaces 17a, 17b are covered with the electric insulating films 19. In each magnet 16, the other first surface 17b (lower one in FIG. 8) of the two first surfaces 17a, 17b, including both ends in the rotor axial direction of the first surface 17b, is entirely covered with no electric insulating films, so that the other first surface 17b is out of direct contact with the rotor core 12.

Gaps between the other first surface 17b and a flat surface portion 14b of each magnet hole 14 are charged with the resin.

Before the resin is poured into each magnet hole 14, as with the configuration of FIG. 4, in a state in which the positioning jigs 24 (see FIG. 4) are disposed at both sides in the rotor axial direction of the rotor core 12, the one first surface 17a of each magnet 16 is brought to come in contact with the flat surface portion 14a of the magnet hole 14 via the electric insulating film 19. In this state, the molten resin is poured into the magnet hole 14, and thereafter is hardened to be formed into the resin portion 20.

According to the above configuration, compared with the configurations of FIG. 1 to FIG. 4, the surfaces where the electric insulating films 19 are formed in each magnet 16 are further reduced, to thus further reduce the cost of the rotor 10b. Unlike the configuration in which no electric insulating film is formed on the entire surface of each magnet 16, the one first surface 17a of each magnet 16 is brought to come in contact with the inner surface of the magnet hole 14 via the electric insulating film 19 so as to stably restrict the position of the magnet 16 in the direction orthogonal to the first surface 17a of the magnet 16 in the magnet hole 14. In the present example, the other configurations and operation are the same as those of FIG. 1 to FIG. 4. In the present example, the one first surface of the two first surfaces 17a, 17b of each magnet 16 is defined to be the first surface 17b that faces inward of the rotor radial direction, and the other first surface may be defined to be the first surface 17a that faces outward of the rotor radial direction. In this case, only in the one first surface 17b of the two first surfaces, both ends in the rotor axial direction are covered with the electric insulating films, so that the one first surface 17b is brought to come in contact with the flat surface portion 14b of the magnet hole 14 via the electric insulating films. The gap between the other first surface 17a and the flat surface portion 14a of each magnet hole 14 is charged with the resin. As with the configurations of FIG. 1 to FIG. 4, in the configuration in which in each magnet 16, the two first surfaces 17a, 17b are both formed with the electric insulating films 19, like the present example, it may be configured to bring only the one first surface of the two first surfaces 17a, 17b to come in contact with the inner surface of each magnet hole 14 via the electric insulating films 19.

Figure 9:
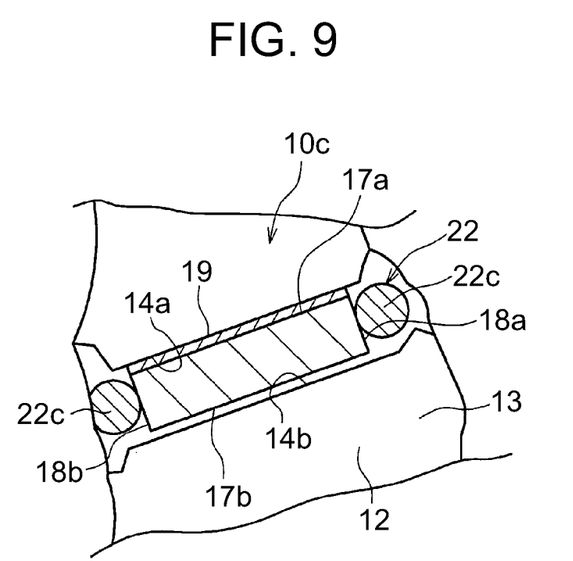
FIG. 9 is a view corresponding to FIG. 7 showing a rotor of the rotating electric machine of another example of the embodiment according to the present disclosure.

FIG. 9 is a view corresponding to FIG. 7, and showing a rotor 10b of another example of the embodiment. In the configuration of the present example, different from the configurations of FIG. 5 to FIG. 7, no resin pouring holes are formed in both the two end plates 22. Each magnet 16 disposed in each magnet hole 14 is held by the end plates 22 that are the positioning members disposed on both ends in the rotor axial direction of the rotor 10b.

In addition, as with the configuration of FIG. 8, only in the one first surface 17a (upper one in FIG. 9) of the two first surfaces 17a, 17b of each magnet 16, both ends in the rotor axial direction are covered with the electric insulating films 19. The one first surface 17a is brought to come in contact with the inner surface of each magnet hole 14 via the electric insulating films 19. The other first surface 17b (lower one in FIG. 9) of the two first surfaces 17a, 17b in each magnet 16, including both ends thereof in the rotor axial direction, is entirely covered with no electric insulating films. In such a manner as to form the gap between the other first surface 17b and the rotor core 12, the pin projections 22c of the above end plates 22 come in contact with the magnet 16 so as to prevent the movement of the magnet 16 in the direction orthogonal to the second surfaces 18a, 18b. In a state in which each magnet 16 is retained by the end plates 22, each magnet hole 14 is charged with no resin, and a rotor 10c is thereby formed in this state.

According to the above configuration, using no resin for fixing the magnets, loss worsening caused by a contact between the other first surface 17b of each magnet 16 and the rotor core 12 can be suppressed. In the present example, the other configurations and operation are the same as the configurations of FIG. 1 to FIG. 4, the configurations of FIG. 5 to FIG. 7, and the configurations of FIG. 8. In the present example, the one first surface of the two first surfaces 17a, 17b of each magnet 16 may be defined to be the first surface 17b facing inward of the rotor radial direction, and the other first surface thereof may be defined to be the first surface 17a facing outward of the rotor radial direction. In this case, only in the one first surface 17b of the two first surfaces, both ends in the rotor axial direction are covered with the electric insulating films, and the one first surface 17b is brought to come in contact with the inner surface of the magnet hole 14 via the electric insulating films 19. In addition, the pin projections of the end plates 22 are brought to contact with each magnet 16 so as to form the gap between the other first surface 17a and the rotor core 12.

In the above description, it is exemplified that provides each positioning jig 24 (FIG. 4) or each end plate 22 (FIG. 5, FIG. 6) is provided with the pin projections to prevent the movement of the magnet 16; however, the shape of each projection is not limited to a pin-like shape, and various shapes, such as a block shape, may be employed. In the configurations of FIG. 1 to FIG. 4, or in the configuration of FIG. 8, the end plates may be disposed on both ends in the axial direction of the rotor.

In the configurations of the above respective examples, it is exemplified that the magnets 16 are arranged at multiple positions in the circumferential direction of the rotor in such a manner that two magnets 16 in each set are disposed in a V-shape; however, the magnets may be arranged in a linear direction along the circumferential direction of each magnet in the rotor. In this case, in each magnet, two surfaces facing both sides in the rotor radial direction are the first surfaces, and two surfaces facing both sides in the rotor circumferential direction are the second surfaces.

What is claimed is:

1. A rotor for a rotating electric machine, the rotor comprising:
   a rotor core having magnet holes;
   magnets inserted in the magnet holes of the rotor core, each of the magnets including two first surfaces respectively facing outward and inward of a rotor radial direction, and two second surfaces respectively facing one side and the other side of a rotor circumferential direction, wherein:
      both ends in a rotor axial direction of at least one first surface of the two first surfaces are covered with electric insulating films, and
      a lateral surface region between both ends of the one first surface that are covered with the electric insulating films, and the two second surfaces are not covered with the electric insulating films; and
   positioning members configured to prevent movement of each magnet in a direction orthogonal to the second surfaces of the magnet,
   wherein the positioning members are disposed on both sides in the rotor circumferential direction and both ends in the rotor axial direction.

2. The rotor for the rotating electric machine according to claim 1, wherein both ends in the rotor axial direction of only the one first surface are covered with the electric insulating films, and the other first surface of the two first surfaces is out of direct contact with the rotor core.

3. The rotor for the rotating electric machine according to claim 1, wherein both ends in the rotor axial direction of only the one first surface are covered with the electric insulating films, the other first surface of the two first surfaces is out of direct contact with the rotor core, and the positioning members are disposed such that a gap is formed between the other first surface and the rotor core.

4. The rotor for the rotating electric machine according to claim 1, wherein the positioning member are disposed on a lateral surface region of the second surfaces of the rotor circumferential direction.

* * * * *